US008761810B2

(12) United States Patent
Farris

(10) Patent No.: US 8,761,810 B2
(45) Date of Patent: Jun. 24, 2014

(54) PREMISES AREA MAP SYSTEMS AND METHODS

(75) Inventor: Jack M Farris, Randolph, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 494 days.

(21) Appl. No.: 12/163,005

(22) Filed: Jun. 27, 2008

(65) Prior Publication Data

US 2009/0325595 A1    Dec. 31, 2009

(51) Int. Cl.
*H04W 24/00*    (2009.01)

(52) U.S. Cl.
USPC ............ 455/457; 455/456.1; 455/456.3; 455/412.2; 455/456.6; 345/660; 345/473; 345/156; 715/853; 715/771; 715/240

(58) Field of Classification Search
CPC ........... H04W 4/02; H04M 1/72572; H04M 3/42229; H04M 3/42348; H04M 15/771
USPC ........... 455/404.2, 404.1–408, 414.1, 414.2, 455/414.3, 456.1–457
See application file for complete search history.

(56) References Cited

U.S. PATENT DOCUMENTS

| | | | |
|---|---|---|---|
| 6,317,605 B1* | 11/2001 | Sakuma | 455/457 |
| 6,829,484 B1* | 12/2004 | Nishigaya et al. | 455/456.1 |
| 6,920,319 B2* | 7/2005 | Knutsson et al. | 455/422.1 |
| 2005/0221806 A1 | 10/2005 | Sengupta et al. | |
| 2006/0258292 A1 | 11/2006 | Kato et al. | |
| 2007/0050340 A1* | 3/2007 | von Kaenel et al. | 707/3 |
| 2007/0293243 A1* | 12/2007 | Shyr et al. | 455/456.2 |
| 2007/0296574 A1* | 12/2007 | Smith et al. | 340/539.13 |
| 2008/0022003 A1 | 1/2008 | Alve | |
| 2008/0102809 A1* | 5/2008 | Beyer | 455/420 |
| 2008/0248815 A1* | 10/2008 | Busch | 455/456.5 |
| 2008/0305775 A1* | 12/2008 | Aaltonen et al. | 455/412.1 |
| 2009/0005018 A1* | 1/2009 | Forstall et al. | 455/414.1 |
| 2009/0167553 A1* | 7/2009 | Hong et al. | 340/825.29 |
| 2009/0258656 A1 | 10/2009 | Wang et al. | |

FOREIGN PATENT DOCUMENTS

WO    PCT/GB07/02337    * 12/2007

* cited by examiner

*Primary Examiner* — Rafael Pérez-Gutiérrez
*Assistant Examiner* — Keith Fang

(57) ABSTRACT

In an exemplary method, a geographic location of a mobile device is determined, a premises area map associated with the geographic location is identified, and data representative of the premises area map is provided to the mobile device over a network. In certain embodiments, data representative of a plurality of premises area maps is received from a plurality of premises area map providers, the data representative of the plurality of premises area maps is stored, and the geographic location is used to select the premises area map from the plurality of premises area maps. In certain embodiments, the premises area map is displayed and graphically represents at least a portion of a premises area. In certain embodiments, the premises area map is configured to illustrate a position of the mobile device within the premises area.

20 Claims, 15 Drawing Sheets

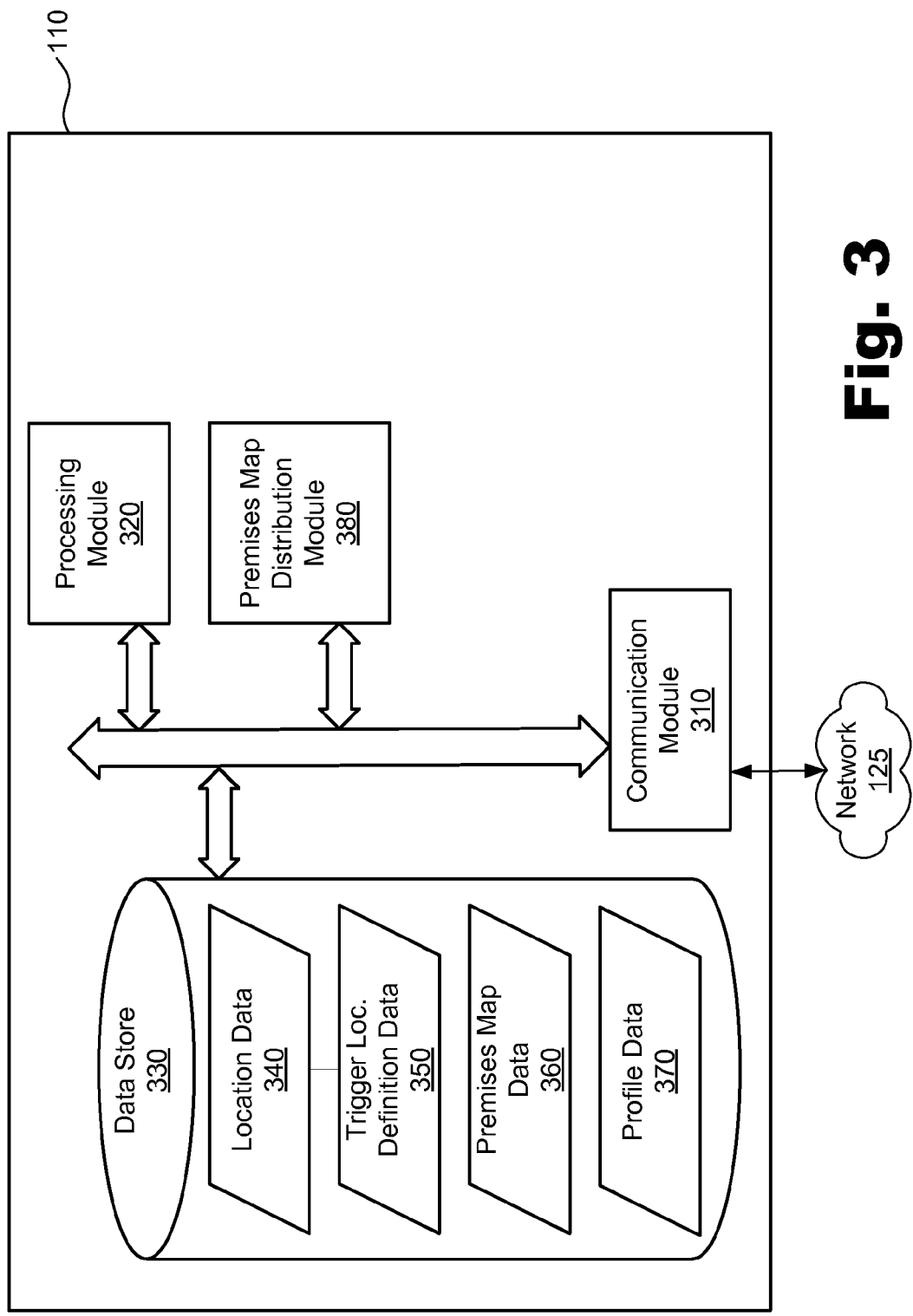

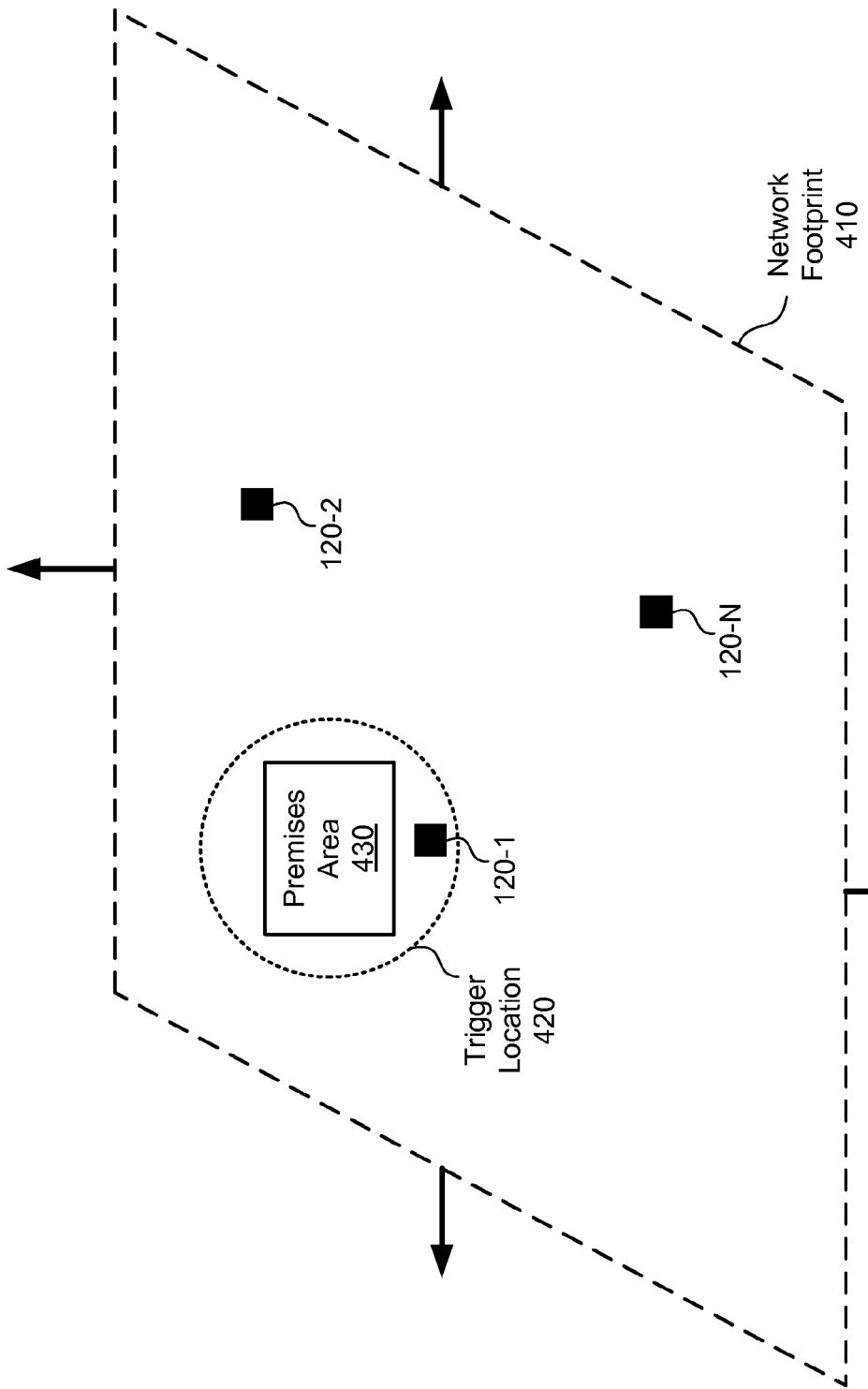

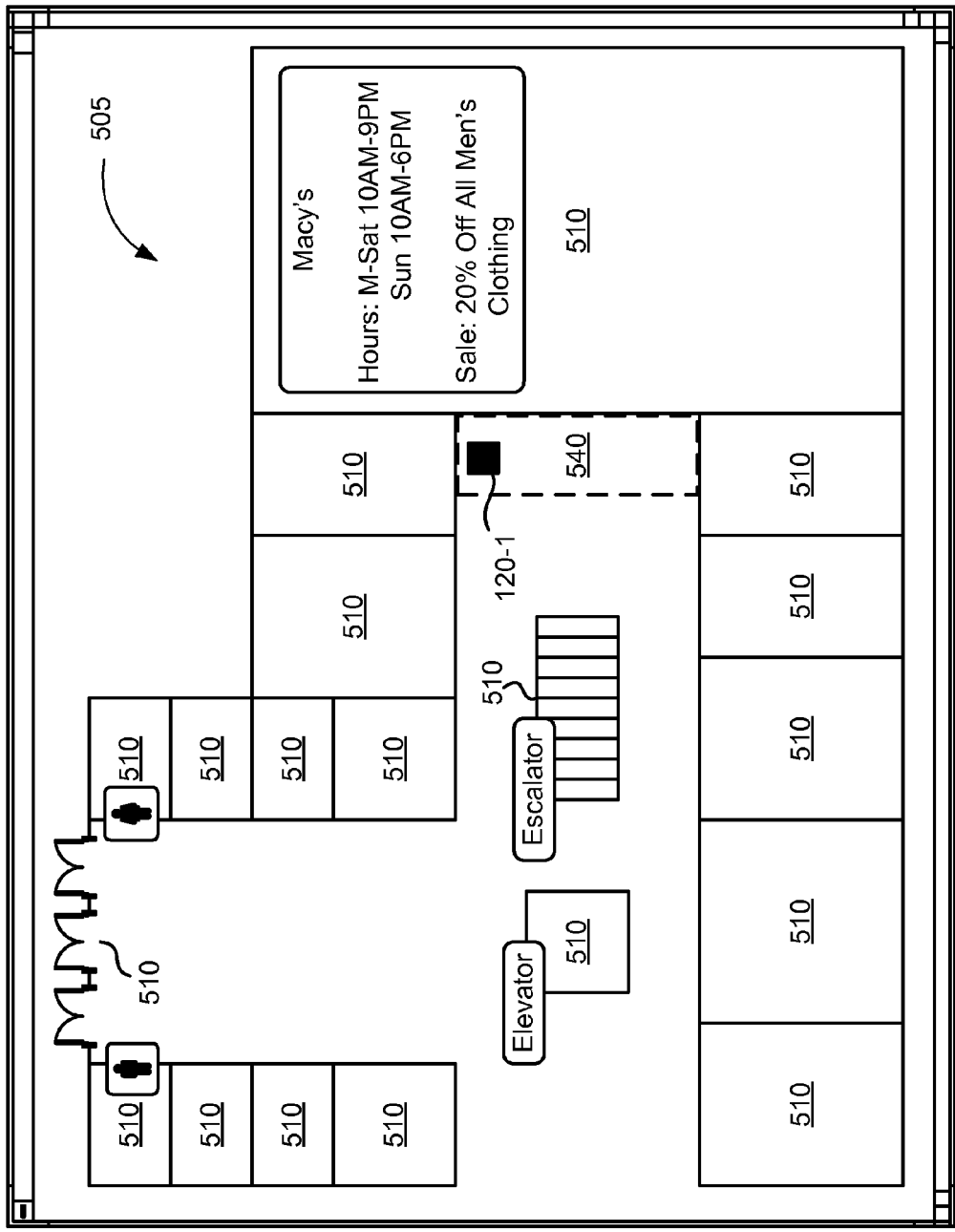

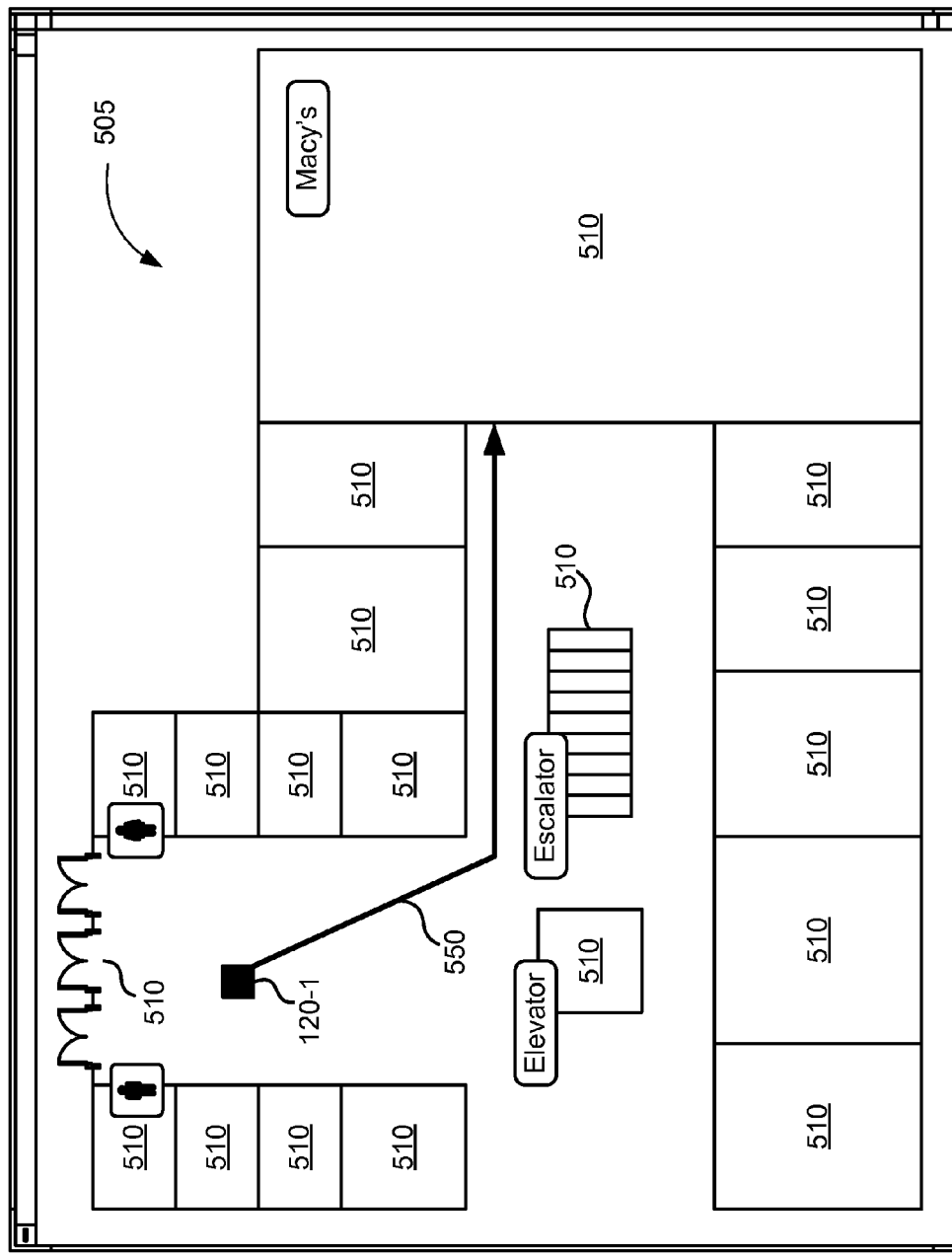

PREMISES AREA MAP SYSTEMS AND METHODS

BACKGROUND INFORMATION

Computerized applications have been developed for generating and providing geographic maps for display on electronic devices. For example, users of computers may access a map application over the Internet and request and download street maps for display. As another example, certain automobiles are equipped with navigational systems capable of displaying street maps of geographic areas within which the automobiles are located. However, such traditional computerized mapping applications are limited to providing high-level geographic maps of open areas that are available for general, public access and mapping. Such maps may not provide the information and/or level of detail desired by certain users.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 3 illustrates an exemplary premises map subsystem that may be included in the system of FIG. 1.

FIG. 4 illustrates mobile devices physically located within an exemplary network footprint.

FIGS. 5A-5H illustrate a graphical user interface having exemplary premises area map views displayed therein.

DETAILED DESCRIPTION OF PREFERRED EMBODIMENTS

Figure 1:
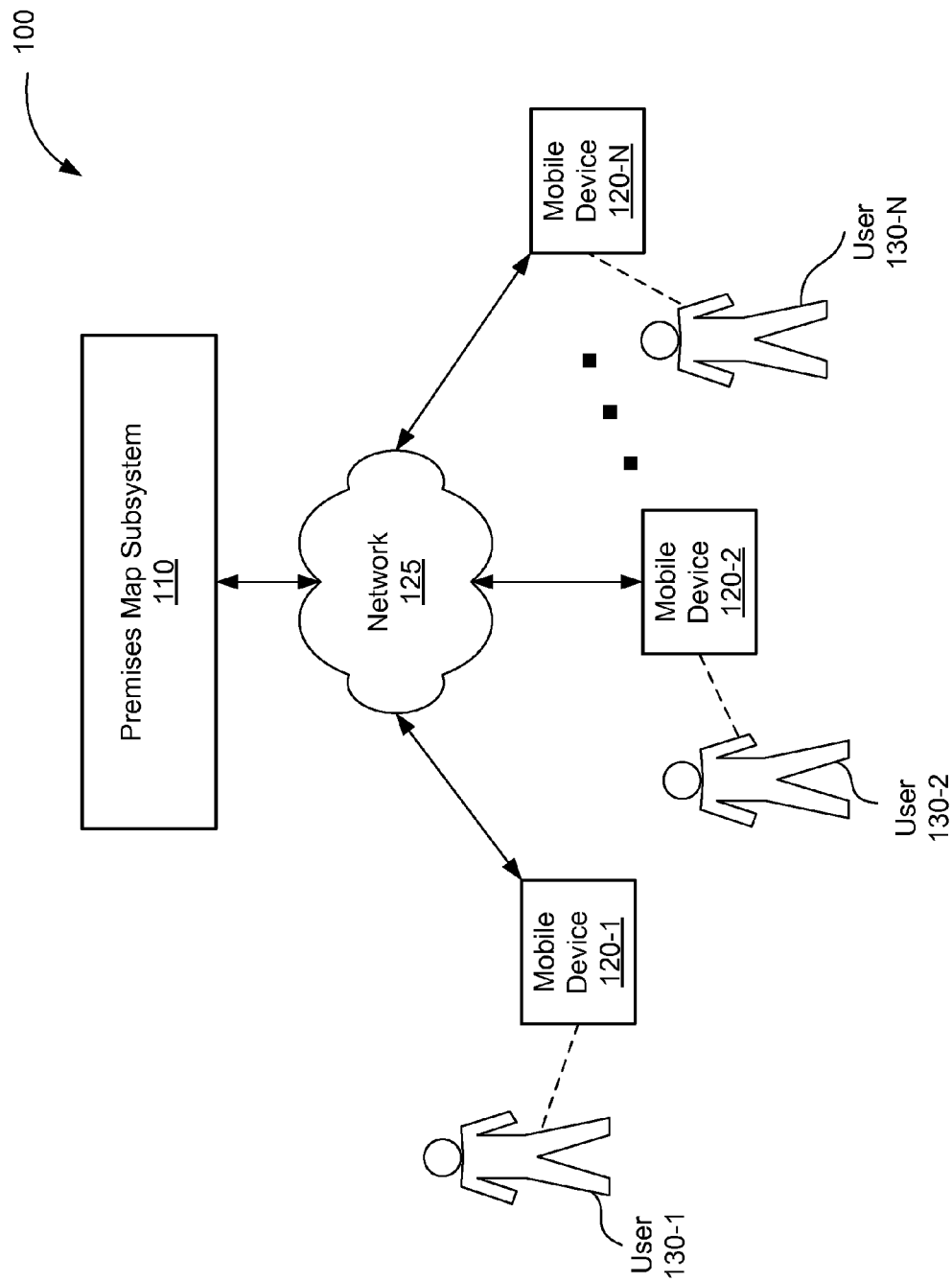
FIG. 1 illustrates an exemplary premises area map system.

Exemplary premises area map systems and methods are described herein. In certain exemplary embodiments, data representative of a premises area map may be provided to a mobile device over a network, which may be configured to display at least a portion of the premises area map for viewing by a user of the mobile device. The premises area map may be provided to the mobile device in response to a request from the mobile device and/or in response to satisfaction of a predefined criterion, e.g., when the mobile device is physically located within a predefined trigger location. In certain embodiments, the mobile device includes a mobile telephone and the network includes a mobile telephone network.

In one exemplary embodiment, a geographic location of a mobile device is determined, a premises area map associated with the geographic location is identified, and data representative of the premises area map is provided to the mobile device over a network. In certain embodiments, the premises area map is displayed by the mobile device and graphically represents at least a portion of a premises area.

In another exemplary embodiment, data representative of a plurality of premises area maps is received from a plurality of premises area map providers, the data representative of the premises area maps is stored, a trigger location is associated with each of the premises area maps, and the premises area maps are selectively distributed to one or more mobile devices based on one or more relationships of the trigger locations to one or more geographic locations of the mobile devices within a network footprint.

In another exemplary embodiment, a system includes a communication module configured to receive location data from a mobile device over a network, the location data indicating a geographic location of the mobile device, a processing module, and a premises map distribution module configured to direct the processing module to identify a premises area map associated with the geographic location of the mobile device, and to provide data representative of the premises area map to the mobile device.

In certain embodiments, supplemental data related to premises area maps may be provided to mobile devices for presentation to users. The supplemental data may be provided for presentation in conjunction with a premises area map. For example, a position of a mobile device within a premises area may be displayed in relation to a premises area map and/or premises reference locations within the premises area map. As another example, information descriptive of premises reference locations (e.g., shops, elevators, escalators, stairs, restrooms, entry/exit ways, etc.) may be presented.

In certain embodiments, premises area maps may be received from premises area map providers (e.g., a building owner or manager) and stored for distribution to mobile devices over the network. A premises area map provider may use an access device to provide data representative of a premises area map to a premises area subsystem configured to selectively distribute the premises area map to one or more mobile devices. In some examples, users of mobile devices may be billed for distribution of premises area maps and/or for related services. Alternatively or additionally, premises area map providers may be billed for storage and/or distribution of premises area maps to mobile devices.

Exemplary embodiments of premises area map systems and methods and examples of premises area maps will now be described in more detail with reference to the accompanying drawings.

FIG. 1 illustrates an exemplary premises area map system 100 (or simply "system 100"). As shown in FIG. 1, system 100 may include a premises map subsystem 110 selectively and communicatively connected to a plurality of mobile devices 120-1 through 120-N (collectively "mobile devices 120") by way of a network 125.

The mobile devices 120 and the premises map subsystem 110 may communicate over network 125 using any communication platforms and technologies suitable for transporting data and/or communication signals, including known communication technologies, devices, media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications networks and technologies.

Network 125 may include one or more networks, including, but not limited to, wireless networks, mobile telephone networks (e.g., cellular telephone networks), closed media networks, open media networks, closed communication networks, open communication networks, satellite networks, navigation networks, broadband networks, narrowband networks, voice communications networks (e.g., VoIP networks), the Internet, wide area networks, local area networks, public networks, private networks, and any other networks capable of carrying data and/or communications signals between mobile devices 120 and premises map subsystem 110. In certain exemplary embodiments, network 125 includes a mobile telephone network, and premises map subsystem 110 and mobile devices 120 are configured to communicate with one another using mobile phone communication technologies.

In some examples, system 100 may include any computer hardware and/or instructions (e.g., software programs), or combinations of software and hardware, configured to perform the processes described herein. In particular, it should be understood that components of system 100 may be implemented on one physical computing device or may be implemented on more than one physical computing device. Accordingly, system 100 may include any one of a number of computing devices and/or computer operating systems (e.g., mobile device operating systems).

Accordingly, the processes described herein may be implemented at least in part as computer-executable instructions, i.e., instructions executable by one or more computing devices, tangibly embodied in a computer-readable medium. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Mobile devices 120 may be associated with users, which in certain embodiments may be subscribers to or users of one or more services (e.g., a wireless telephone service and/or a premises map service) provided over network 125. As an example, FIG. 1 shows users 130-1, 130-2, and 130-N (collectively "users 130") as being associated with mobile devices 120-1, 120-2, and 120-N, respectively. The exemplary users 130 and their particular associations with mobile devices 120 are shown for illustrative purposes. Other user associations with mobile devices 120 may be defined in system 100.

Mobile device 120 may include any device configured to perform one or more of the mobile device operations described herein, including communicating with premises map subsystem 110 by way of network 125. Mobile device 120 may include, but is not limited to, a wireless computing device, a wireless communication device (e.g., a mobile telephone configured to access one or more services provided over network 125), a portable computing device (e.g., a laptop computer), a portable communication device, a personal digital assistant, a vehicular computing and/or communication device, a vehicle (e.g., an automobile), a portable navigation device, a Global Positioning System ("GPS") device, and/or any other mobile device configured to perform one or more of the mobile device operations described herein.

Figure 2:
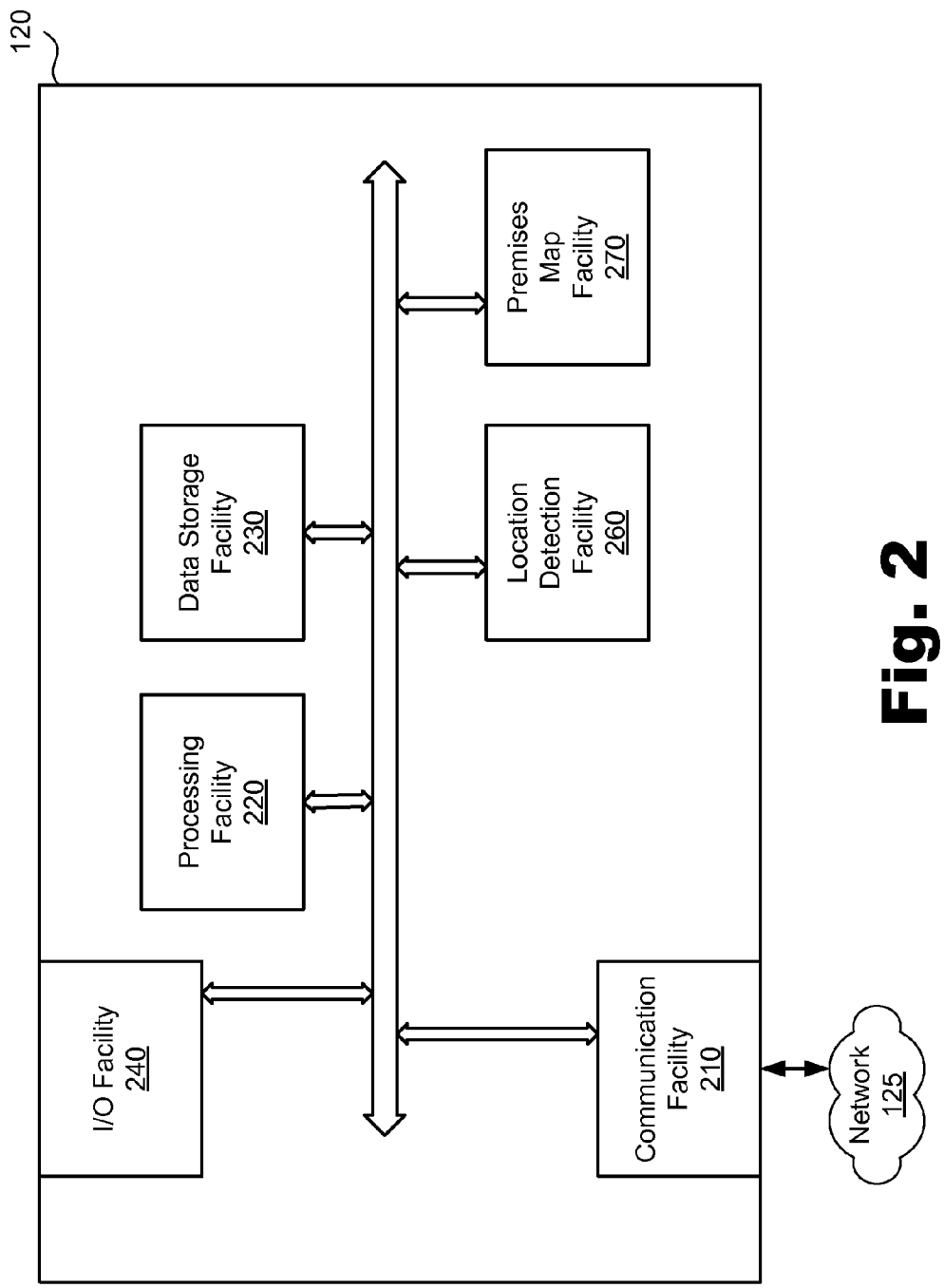
FIG. 2 illustrates an exemplary mobile device that may be used in the system of FIG. 1.

FIG. 2 illustrates components of an exemplary mobile device 120. As shown in FIG. 2, mobile device 120 may include a communication facility 210, processing facility 220, data storage facility 230, input/output ("I/O") facility 240, location detection facility 260, and premises map facility 270 communicatively connected to one another. The facilities 210-270 may be communicatively connected using any suitable technologies. Each of the facilities 210-270 may be implemented as hardware, computing instructions (e.g., software) tangibly embodied on a computer-readable medium, or a combination of hardware and computing instructions configured to perform the processes described herein.

Communication facility 210 may be configured to send and receive communications over network 125, including sending and receiving data representative of geographic locations and other communications to/from premises map subsystem 110. Communication facility 210 may include any device, logic, and/or other technologies suitable for transmitting and receiving data representative of geographic locations and other communications. In certain embodiments, the communication facility 210 may be configured to support other network service communications over network 125, including wireless voice, data, and messaging communications. The communication facility 210 may be configured to interface with any suitable communication media, protocols, formats, platforms, and networks, including any of those mentioned herein.

Processing facility 220 may be configured to control operations of one or more components of the mobile device 120. Processing facility 220 may execute and/or direct execution of operations in accordance with computer-executable instructions such as may be stored in data storage facility 230 or other computer-readable medium. As an example, processing facility 220 may be configured to process communications, including demodulating, decoding, and parsing received communications, and encoding and modulating communications for transmission to premises map subsystem 110.

Data storage facility 230 may include one or more data storage media, devices, or configurations and may employ any type, form, and combination of storage media. For example, the data storage facility 230 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Data, including data representative of geographic locations and/or premises area maps, may be temporarily and/or permanently stored in the data storage facility 230.

I/O facility 240 may be configured to receive user input and provide user output and may include any hardware, firmware, software, or combination thereof supportive of input and output capabilities. For example, I/O facility 240 may include one or more devices for capturing user input, including, but not limited to, a microphone, keyboard or keypad, touch screen component, and receiver (e.g., an RF or infrared receiver).

I/O facility 240 may include one or more components for presenting data and/or content for experiencing by the user 130, including, but not limited to, a graphics engine, a display, display drivers, one or more audio speakers, and one or more audio drivers. Accordingly, I/O facility 240 may present data and/or content (e.g., display map views) for experiencing by the user 130. I/O facility 240 may also be configured to provide other output for the user 130, including providing notifications of premises area maps becoming accessible as described further below.

Location detection facility 260 may include any hardware, computing instructions (e.g., software), or combination thereof configured to detect a geographic location of the mobile device 120. In some embodiments, the location detection facility 260 may be configured to utilize GPS technologies to determine the geographic location of the mobile device 120, which location may be identified in terms of GPS coordinates. Other suitable location detection technologies may be used in other embodiments, including using principles of trilateration to evaluate radio frequency signals received by the mobile device 120 (e.g., RF signals in a wireless phone network or other wireless network) and to estimate the geographic location of the mobile device 120.

Location detection facility 260 may be configured to detect the geographic location of a mobile device 120 periodically at a predetermined frequency or time, or in response to a predetermined trigger event. Such a trigger event may include, but is not limited to, receipt of an instruction from premises map facility 270 and/or premises map subsystem 110. In certain embodiments, location detection facility 260 may be configured to continually detect the geographic location of mobile device 120 (i.e., location detection facility 260 may be configured to be "always on"). In such embodiments, location detection facility 260 may continually detect the location of the mobile device 120 at a predefined frequency (e.g., every one or two seconds). In some examples, a user 130 of mobile device 130 may selectively enable location detection operations such as by launching location detection facility 260, for example.

Once location detection facility 260 has detected the geographic location of the mobile device 120, the location detection facility 260 may generate and provide location data (e.g., GPS coordinates) representative of the detected geographic location of the mobile device 120. The location data may be provided to data storage facility 230 for storage, to premises map facility 270 for processing, and/or to communication module 210 for transmission to premises map subsystem 110.

Premises map facility 270 may include any hardware, computing instructions (e.g., software), or combination thereof configured to perform one or more of the mobile device premises map operations described herein. In certain embodiments, premises map facility 270 includes computing instructions (e.g., a software application) configured to direct mobile device 120 (e.g., direct processing facility 220 of the mobile device 120) to perform one or more of the mobile device premises mapping operations described herein. In some examples, a user 130 of mobile device 120 may selectively launch or terminate premises map facility 270 to respectively enable or disable premises mapping operations and/or services.

In certain implementations, premises map facility 270 may be omitted from mobile device 120, and premises map subsystem 110 may be configured to perform one or more operations that would have otherwise been performed by premises map facility 270. Such implementations may help conserve resources of mobile device 120.

As mentioned, a mobile device 120 may provide location data representing a geographic location of the mobile device 120 to premises map subsystem 110. Premises map subsystem 110 may receive location data from mobile device 120 and selectively distribute premises area map data based on the location data. FIG. 3 illustrates components of an exemplary premises map subsystem 110. The components of premises map subsystem 110 may include or be implemented as hardware, computing instructions (e.g., software) embodied on a computer-readable medium, or a combination thereof. In certain embodiments, for example, one or more components of premises map subsystem 110 may include or be implemented on one or more servers (e.g., an application server, content server, messaging server, and/or web server) configured to communicate over network 125. While an exemplary premises map subsystem 110 is shown in FIG. 3, the exemplary components illustrated in FIG. 3 are not intended to be limiting. Indeed, additional or alternative components and/or implementations may be used.

As shown in FIG. 3, premises map subsystem 110 may include a communication module 310, which may be configured to transmit and receive communications over network 125, including receiving data (e.g., location data) from and providing data representative of premises area maps to mobile devices 120 by way of network 125. The communication module 310 may include and/or support any suitable communication platforms and technologies for communicating with and transporting data and other communications to/from mobile devices 120 over network 125. Communication module 310 may be configured to support a variety of communication platforms, protocols, and formats such that premises map subsystem 110 can receive location data from and distribute data representative of premises area maps to mobile devices 120 and/or other access devices of a variety of platforms (e.g., a mobile telephone service platform, a web-based platform, a Wi-Fi platform, etc.) and using a variety of communications technologies. Accordingly, premises map subsystem 110 can support a multi-platform system in which data and communications can be received from and provided to diverse platforms.

Premises map subsystem 110 may include a processing module 320 configured to control operations of components of the mobile device 120. Processing module 320 may execute and/or direct execution of operations in accordance with computer-executable instructions stored to a computer-readable medium such as a data store 330. As an example, processing module 320 may be configured to process (e.g., encode, decode, modulate, and/or demodulate) data and communications received from or to be transmitted to mobile devices 120 over network 125. As another example, processing module 320 may be configured to perform data management operations for storing data to data store 330 and for identifying, indexing, searching, retrieving, modifying, annotating, and/or deleting data stored in data store 330.

Data store 330 may include one or more data storage media, devices, or configurations and may employ any type, form, and combination of storage media. For example, the data store 330 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof.

Data store 330 may store any suitable type or form of electronic data. As shown in FIG. 3, data store 330 may include mobile device location data 340 ("location data 340"), trigger location definition data 350, premises map data 360, and profile data 370. Location data 340 may include data representative of one or more geographic locations of one or more mobile devices 120 and may include location data received from mobile devices 120 over network 125. Location data 340 may be in any suitable format for identifying one or more geographic locations, including GPS coordinates, for example.

Trigger location definition data 350 may include data representative of one or more geographic locations or areas that have been defined as being associated with one or more premises area maps. Such geographic locations or areas may be defined in any suitable way and may be referred to as "trigger locations." For example, a trigger location may be defined as a set of one or more geographic location coordinates (e.g. GPS coordinates). As another example, a trigger location may be defined as one or more ranges of geographic location coordinates, or as an area or space defined by certain location coordinates (e.g., a rectangle defined by four corner location points). As yet another example, a trigger location may be defined to include a particular location point (e.g., a location defined by GPS coordinates) and an area or volume of space that is located within a predetermined distance of the location point. For instance, a trigger location may be defined to include a location point associated with a premises area and a generally circular area that is located within a predetermined radius of the location point. These examples of trigger location definitions are illustrative only. Any suitable definition may be used in other embodiments. An exemplary trigger location will be described further below.

Premises map data 360 may include data representative of premises area maps. As used herein, "premises" may refer to a building, a building complex, land and/or structures surrounding a building or building complex, private land, semi-private land, semi-public land, man-made structures, natural structures, and other distinct local areas and/or structures. In some examples, a premises may be owned by or under control of a single entity or person. Examples of premises may include, but are not limited to, shopping centers (e.g., shopping malls), exhibition halls, amusement parks, zoos, theme parks, museums, parks, hospitals, libraries, office buildings, hotels, conference centers, storage unit complexes, transportation hubs (e.g., bus depots, train stations, subway stations, and airports), entertainment venues (e.g., stadiums and arenas), schools (e.g., college campuses), work sites, construction sites, and governmental sites. Accordingly, a premises area map may include a visual map illustrating at least a portion of a premises area. For example, a premises area map may include, but is not limited to, a map of an interior and/or exterior layout of a building or other premises area. Examples of premises area maps are described further below.

Profile data 370 may include any information associated with particular users 130 and/or mobile devices 120, including user profile information, permissions settings, preferences, custom defined trigger locations, custom defined premises reference locations, etc. Profile data 370 may be defined to control permissions for accessing premises area maps. For example, profile data 370 may indicate one or more premises area maps, or sections of premises area maps, to which a particular user has or does not have access. As another example, profile data 370 may indicate one or more trigger locations that have been associated with a user 130 and/or mobile device 120 and that will trigger delivery of one or more premises area maps to the mobile device 120.

As shown in FIG. 3, premises map subsystem 110 may further include a premises map distribution module 380, which may include or be implemented as hardware, computing instructions (e.g., software) tangibly embodied on a computer-readable medium, or a combination of hardware and computing instructions configured to perform one or more premises mapping operations described herein. In certain embodiments, premises map distribution module 380 may be implemented as a software application embodied on a computer-readable medium such as data store 330 and configured to direct the processing module 320 to execute one or more of the processes described herein.

Premises map distribution module 380 may be configured to control distribution of premises area maps to mobile devices 120. In certain embodiments, distribution of premises area maps may be based on geographic locations of mobile devices 120. To help facilitate an understanding of selective, location-based distribution of premises area maps, FIG. 4 illustrates mobile devices 120-1, 120-2, and 120-N physically located at different geographic locations within an exemplary network footprint 410. The network footprint 410 refers to a collective geographic space within which mobile devices 120 are able to receive network communication signals (e.g., signals from a satellite or a broadcast tower). As represented by arrows in FIG. 4, the reach of the network footprint 410 may extend beyond the illustrated portion of the network footprint 410. Additionally, while FIG. 4 illustrates a two-dimensional network footprint 410, it will be understood that the network footprint 410 may be three dimensional in certain implementations.

Mobile devices 120-1, 120-2, and 120-N may detect their respective geographic locations and provide location data representative of their respective geographic locations to premises map subsystem 110 over network 125. Premises map subsystem 110 may receive and process the location data, including determining, based on the location data, whether any of the mobile device 120-1, 120-2, and 120-N is located within a predefined trigger location 420 associated with a premises area 430 located within the network footprint 410.

Trigger location 420 may be defined in any of the ways described above and may be represented as trigger location definition data 350 in data store 330. Trigger location definition data 350 may also indicate that trigger location 420 is associated with premises area 430 and/or with a map of premises area 430, which premises area map may be represented in premises map data 360 in data store 330.

In the illustrated example, trigger location 420 includes a circular area encompassing and extending beyond premises area 430. This is illustrative only and not limiting in any sense. Other definitions of trigger locations 420 may be used in other implementations and as may suit a particular application or premises. For example, trigger location 420 may be defined to approximately match premises area 430.

In the example shown in FIG. 4, mobile devices 120-2 and 120-N are not physically located within trigger location 420. Accordingly, when mobile devices 120-2 and 120-N provide location data indicative of their geographic locations to premises map subsystem 110, premises map subsystem 110 may determine from the provided location data that mobile devices 120-2 and 120-N are not located within trigger location 420. This determination may be made in any suitable way, including premises map distribution module 380 comparing location data received from the mobile devices 120-2 and 120-N with trigger location definition data 350 including a definition of trigger location 420. When mobile devices 120-2 and 120-N are determined not to be within trigger location 420, premises map subsystem 110 may elect not to perform further premises mapping operations for mobile devices 120-2 and 120-N.

In this or similar manner, premises map subsystem 110 may receive location data from mobile device 120-1 and determine from the location data that mobile device 120-1 is physically located within trigger location 420. In response to this determination, premises map subsystem 110 may identify and provide at least one premises area map of at least a section of premises area 430 to mobile device 120-1. The identification of premises area map may be performed in any suitable way, including premises map distribution module 380 using trigger location definition data 350, premises map data 360, and/or other data representative of a relationship between trigger location 420 and at least one of the premises area 430 and the premises area map to identify that the premises area map has been defined in advance as being associated with trigger location 420.

Premises map subsystem 110 may provide data representative of an identified premises area map to mobile device 120-1. The premises area map data may be provided to mobile device 120-1 in any suitable way, including premises map subsystem 110 transmitting (e.g., downloading) the data to mobile device 120-1 over network 125.

In certain embodiments, premises map subsystem 110 may be configured to provide a notification of a premises area map becoming accessible to mobile device 120-1. For example, when premises map subsystem 110 determines that mobile device 120-1 is located within trigger location 420, premises map subsystem 110 may generate and transmit a notification message to mobile device 120-1. Mobile device 120-1 may receive and present the notification message to a user 130-1 of the mobile device 120-1. Notification message may solicit user input, and mobile device 120-1 may receive input from the user 130-1 indicating whether the user 130-1 approves of transmission of the premises area map data to mobile device 120-1. Using I/O facility 340 of mobile device 120-1, user 130-1 may provide input indicating approval or rejection of transmission of the premises area map data from premises map subsystem 110. Mobile device 120-1 may interpret the user input and communicate with premises map subsystem 110 requesting premises map subsystem 110 transmit or not transmit the premises area map data to mobile device 120-1.

As an example, when mobile device 120-1 moves within trigger location 420 (i.e., within a predefined distance of premises area 430), premises map subsystem 110 may detect this event and send a notification to the mobile device 120-1 notifying user 130-1 of the availability of a premises area map associated with premises area 430. User 130-1 may indicate acceptance of the premises area map, and premises map subsystem 110 may transmit data representative of the premises area map to the mobile device 120-1 for display. In an example in which premises area is a shopping mall, user 130-1 may be notified of and/or receive a premises area map of the shopping mall (e.g., a map showing the layout of shops within the mall) via mobile device 120-1 when the user 130-1 is located proximate to the shopping mall (e.g., on a street adjacent to the shopping mall or in a parking lot at the shopping mall).

Additionally or alternatively to selectively providing premises area maps based on geographic locations of mobile devices 120, in certain embodiments premises map subsystem 110 may be configured to provide premises area maps in response to user requests. For example, user 130-1 of mobile device 120-1 may utilize mobile device 120-1 to send a request to premises map subsystem 110 for data representative of a premises area map. Premises map subsystem 110 may respond by providing data representative of the requested premises area map to mobile device 120-1 without regard for the geographic location of the mobile device 120-1. In some embodiments, mobile device 120-1 may be configured to provide user 130-1 with one or more tools for searching, identifying, and/or requesting premises area maps stored by premises map subsystem 110.

In certain embodiments, premises map subsystem 110 may be configured to selectively provide premises area maps based on profile data 370. For example, premises map distribution module 380 may use profile data 370 to determine whether user 130-1 and/or mobile device 120-1 has permission to access a particular premises area map. As an example, a premises area map associated with premises area 430 and trigger location 420 may be defined as accessible to only a predefined group of mobile devices 120. Accordingly, when mobile device 120-1 is detected to be located within trigger location 420 and premises map distribution module 380 has identified an associated premises area map, premises map distribution module 380 may also verify, based on profile data 370, that mobile device 120-1 is included in the predefined group before premises map subsystem 110 provides the premises area map to mobile device 120-1.

Mobile device 120-1 may be configured to receive data representative of a premises area map from premises map subsystem 110 and to display the premises area map for viewing by user 130-1. To facilitate an understanding of premises area maps and related data and features, FIGS. 5A-5H illustrate an exemplary graphical user interface ("GUI") 500 that may be displayed by mobile device 120-1. As shown in FIGS. 5A-5H, GUI 500 may include at least a portion of a premises area map 505 displayed therein. In the illustrated examples, premises area map 505 includes a map of a layout of an interior section of a premises area 430 such as a building (e.g., a shopping mall).

The examples illustrated in FIGS. 5A-5H are illustrative only. Other premises area maps may include other layouts, structures, and/or features of premises areas. For example, while FIGS. 5A-5H illustrate an interior layout of premises area 430, other premises area maps may additionally or alternatively illustrate exterior layouts or features. For instance, an exterior parking lot of a premises area 430 may be included and displayed in premises area map 505.

Figure 5A:
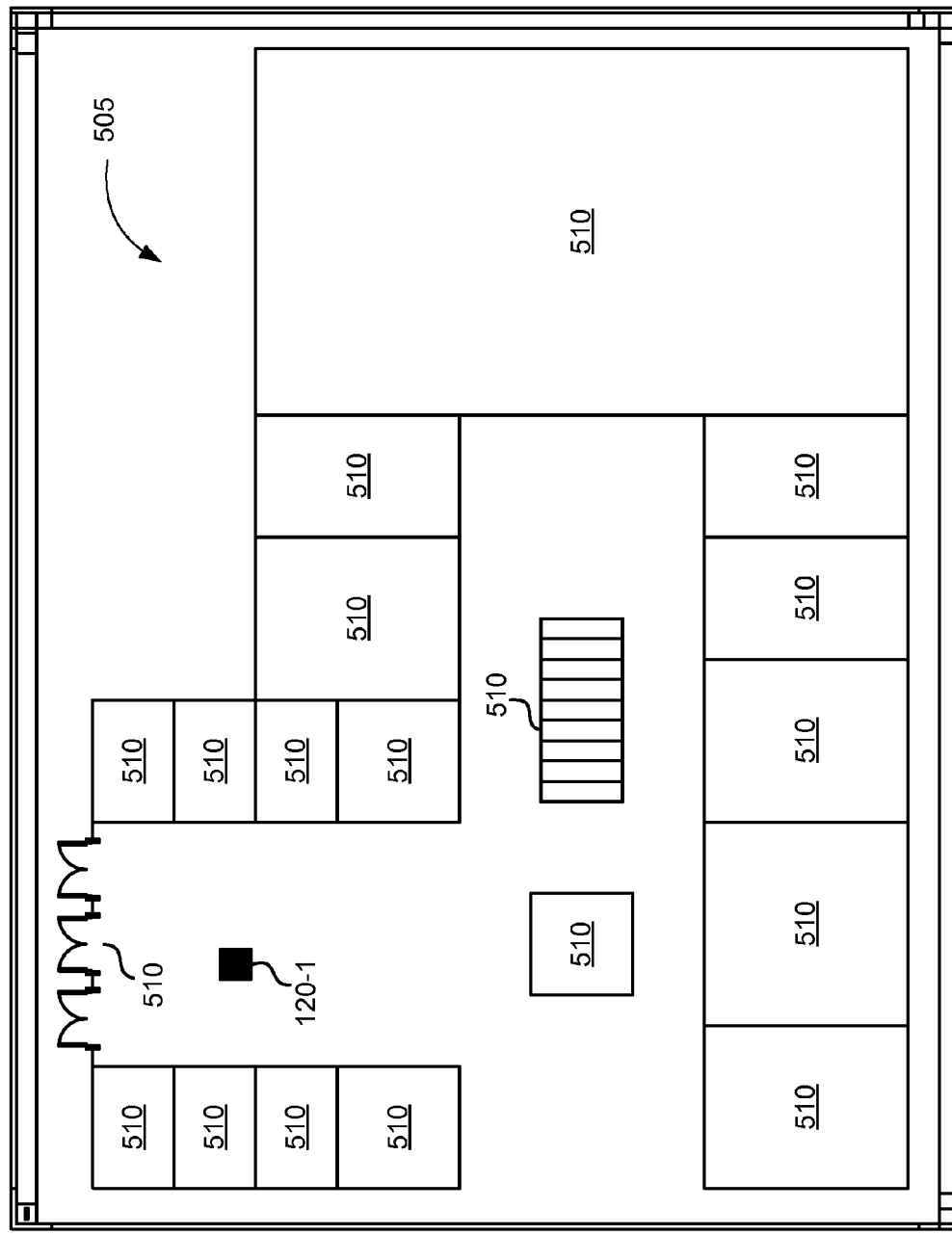

As shown in FIG. 5A, premises area map 505 may visually indicate one or more premises reference locations 510 and the layout of the premises reference locations 510 in the premises area 430. Premises reference locations 510 may include structures, locations, and/or other reference points included in a premises area 430 and may be arranged to represent the actual layout of the premises reference locations 510 within premises area 430. As an example, premises reference locations 510 may represent structures located within a shopping mall, including stores, shops, entry and/or exit ways, escalators, stairs, elevators, kiosks, information desks, food courts, restrooms, etc. As another example, premises reference locations 510 may include meeting rooms within a conference center, work site, or hotel. Premises reference locations 510 may function as granular reference points supporting navigations within a premises area 430 such as a shopping mall or other building.

In certain embodiments, premises area map 505 may provide a visual indication of a location of mobile device 120-1 within premises area 430. FIG. 5A illustrates a graphical representation of mobile device 120-1 at a position within the premises area map 505. This may represent an actual position of mobile device 120-1 within premises area 430. The location may be determined by applying the location data generated and provided by mobile device 120-1 in relation to premises map data 360 associated with the premises area 430. Accordingly, the geographic location of mobile device 120-1 within premises area 430 may be incorporated and represented in premises area map 505. The position of the graphical representation of mobile device 120-1 may move about in relation to premises area map 505 to reflect actual movement of the mobile device 120-1 about the premises area 430. Accordingly, user 130-1 may utilize premises area map 505 displayed on mobile device 120-1 to navigate within the premises area 430. In certain embodiments, the graphical representation of mobile device 120-1 may represent the real time position of the mobile device 120-1 within the premises area 430 and/or in relation to premises reference locations 510 in the premises area 430.

Figure 5B:
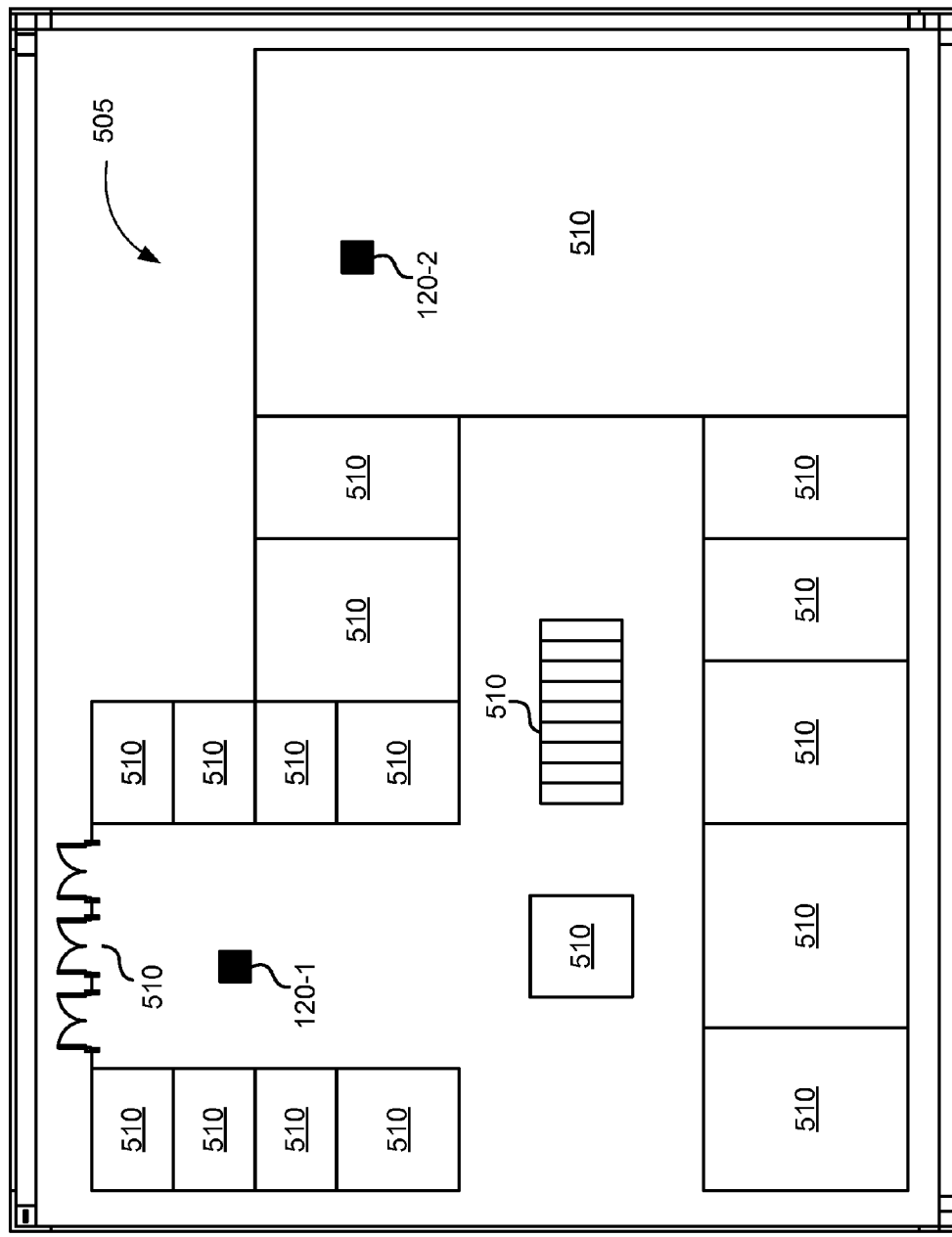

Positions of other mobile devices 120 within premises area 430 may be incorporated and represented in premises area map 505 displayed by mobile device 120-1. FIG. 5B illustrates GUI 500 with graphical representations of the physical locations of mobile devices 120-1 and 120-2 displayed in premises area map 505. Accordingly, user 130-1 of mobile device 120-1 may ascertain from premises area map 505 a location of another mobile device 120-2 within premises area 430. This may be useful for various applications, including a parent monitoring the location of a child within a premises area 430 such as a shopping mall, for example.

Mobile device 120-2 may be identified in advance for inclusion in a premises area map 505 displayed on mobile device 120-1. In certain embodiments, for example, mobile devices 120 associated with a common subscription or subscriber may be grouped together and the grouping used to determine which mobile devices 120 to consider for inclusion in a premises area map view. In certain embodiments, groupings of mobile devices 120 may be defined in profile data 370 and used to determine which mobile devices 120 are included in a premises area map view. In certain embodiments, groupings defined for other services provided over network 125, such as Verizon's Chaperone<sup>SM</sup> service, may be leveraged to determine which mobile devices 120 to consider for inclusion in a premises area map view.

Premises area map data 360 transmitted from premises map subsystem 110 to mobile device 120-1 may include supplemental data related to premises area map 505 and/or premises reference locations 510 included in the premises area map 505. Supplemental data may include any information related to or descriptive of premises area map 505, premises reference locations 510 included in premises area map 505, and/or services, products, events, or facilities provided at or otherwise associated with premises area 430. Certain examples of supplemental data will now be described.

Figure 5C:
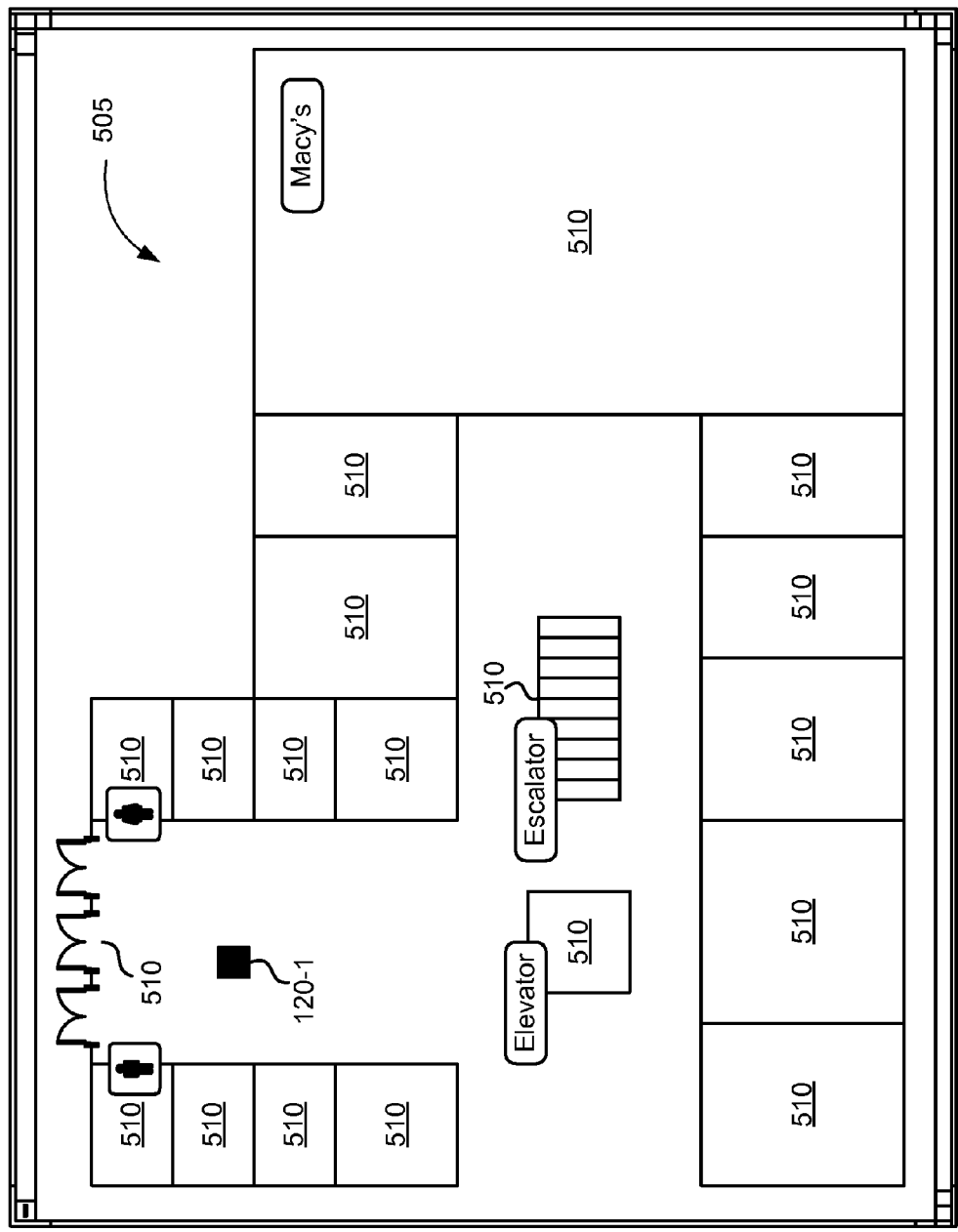

FIG. 5C illustrates an example of supplemental data associated with premises area map 505 displayed in GUI 500. As shown, supplemental data may include store names (e.g., a store known as "Macy's"), structure descriptions (e.g., "escalator," "elevator," etc.), and restroom indicators associated with certain premises reference locations 510 in premises area map 505. Other examples of supplemental data may include, but are not limited to, premises entry and/or exit information, stairway information, information about products and/or services provided (e.g., "men's clothes") by premises reference locations 510, hours of operation, restaurant menu information, reservations information, customer traffic information, product and/or service availability (e.g., movie tickets available or sold out), wait time information, sale and/or specials information, electronic coupons, advertising information, and any other information related to or descriptive of premises area map 505, premises reference locations 510 included in premises area map 505, and/or services, products, events, or facilities provided at premises area 430.

Figure 5D:
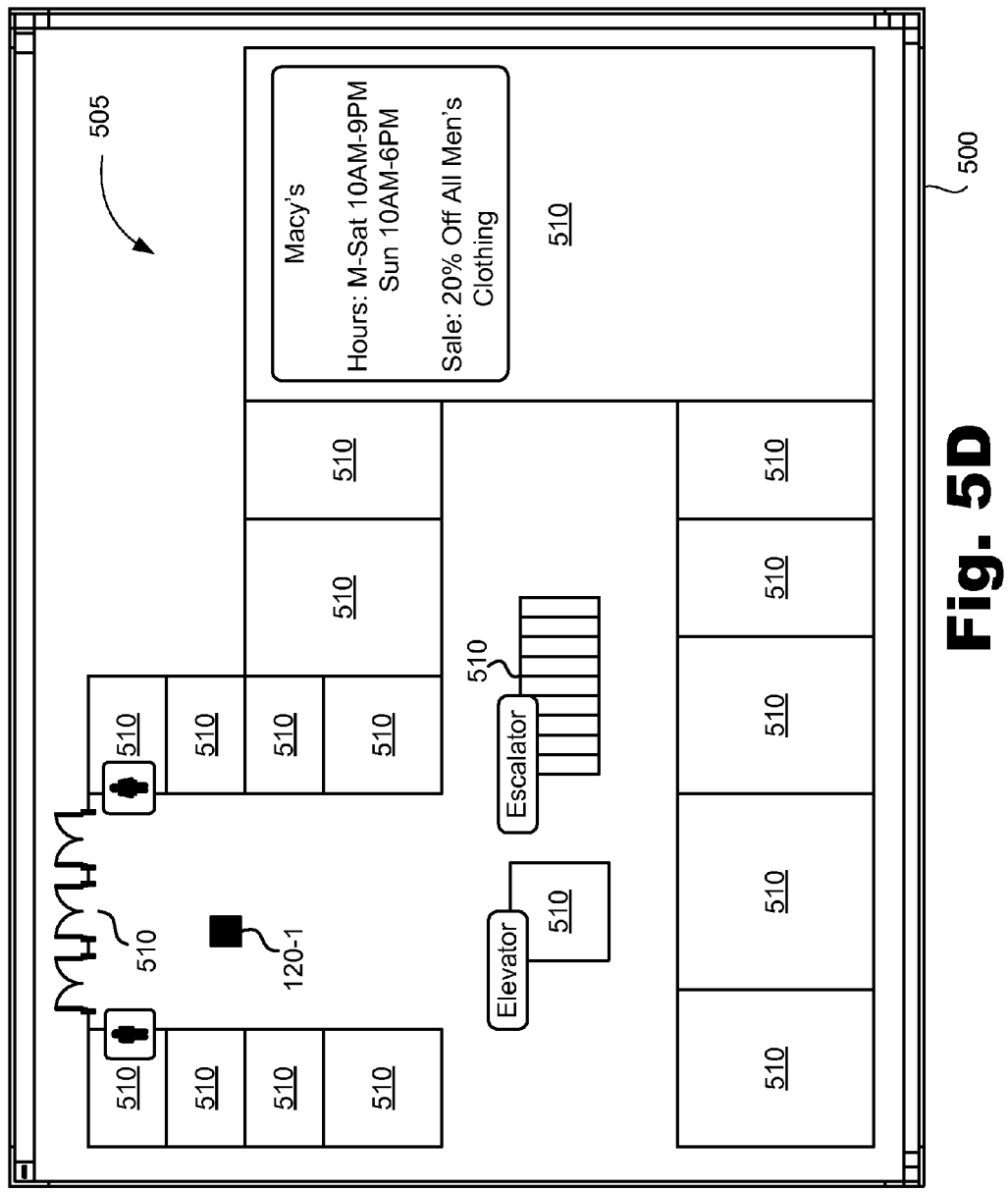

FIG. 5D illustrates another example of supplemental data associated with premises area map 505 displayed in GUI 500. As shown in FIG. 5D, supplemental data may include information about a sales event and hours of operation associated with the "Macy's" store.

In certain embodiments, different levels of supplemental data may be defined and provided together with premises area map 505. For example, a first level of supplemental data for a particular premises reference location 510 may include a store name such as "Macy's" as shown in FIG. 5C, and a second level of supplemental data for the same premises reference location 510 may include other supplemental data such as hours of operation and sales information as shown in FIG. 5D. In certain examples, a first level of supplemental data may be presented in a first view (e.g., an initial view) of premises area map 505, and a second level of supplemental data may be presented when an occurrence of a predefined event is detected, such as when user 130-1 of mobile device 120-1 requests additional supplemental data (e.g., by selecting a premises reference location 510 in premises area map 505), when mobile device 120-1 is located within the premises reference location 510, or when mobile device 120-1 is located within a predefined distance of the premises reference location 510. For instance, a display of premises area map 505 may change from the view shown in FIG. 5C to the view shown in FIG. 5D when any of the above-described predetermined criteria is satisfied (e.g., mobile device 120-1 moves within the "Macy's" premises reference location 510.

In this or similar manner, a premises area map view displayed in GUI 500 may change based on the physical location of mobile device 120-1 within premises area 430. In certain embodiments, premises trigger locations may be defined within premises area 430 and used to trigger presentation of supplemental data, for example.

Premises trigger locations may be defined in any suitable way such as a set of one or more geographic location coordinates (e.g. GPS coordinates). For instance, a premises trigger location may be defined as a set of location coordinates corresponding with a particular geographic area or location within premises area 430. As another example, a premises trigger location may be defined as one or more ranges of geographic location coordinates, or as an area or space defined by certain location coordinates (e.g., a rectangle defined by four corner location points) within premises area 430. As yet another example, a premises trigger location may be defined to include a particular location point (e.g., a location defined by GPS coordinates) within premises area 430 and an area or volume space that is located within a predetermined distance of the location point. For instance, a premises trigger location may be defined to include a location point and a generally circular area that is located within a predetermined radius of the location point. In certain embodiments, a premises trigger location is defined to include the geographic area or space associated with a premises reference location 510 (e.g., the area of the "Macy's" store). Alternatively or additionally, a premises trigger location may be defined to extend beyond and include geographic area or space outside of the geographic area or space associated with a premises reference location 510.

Figure 5E:
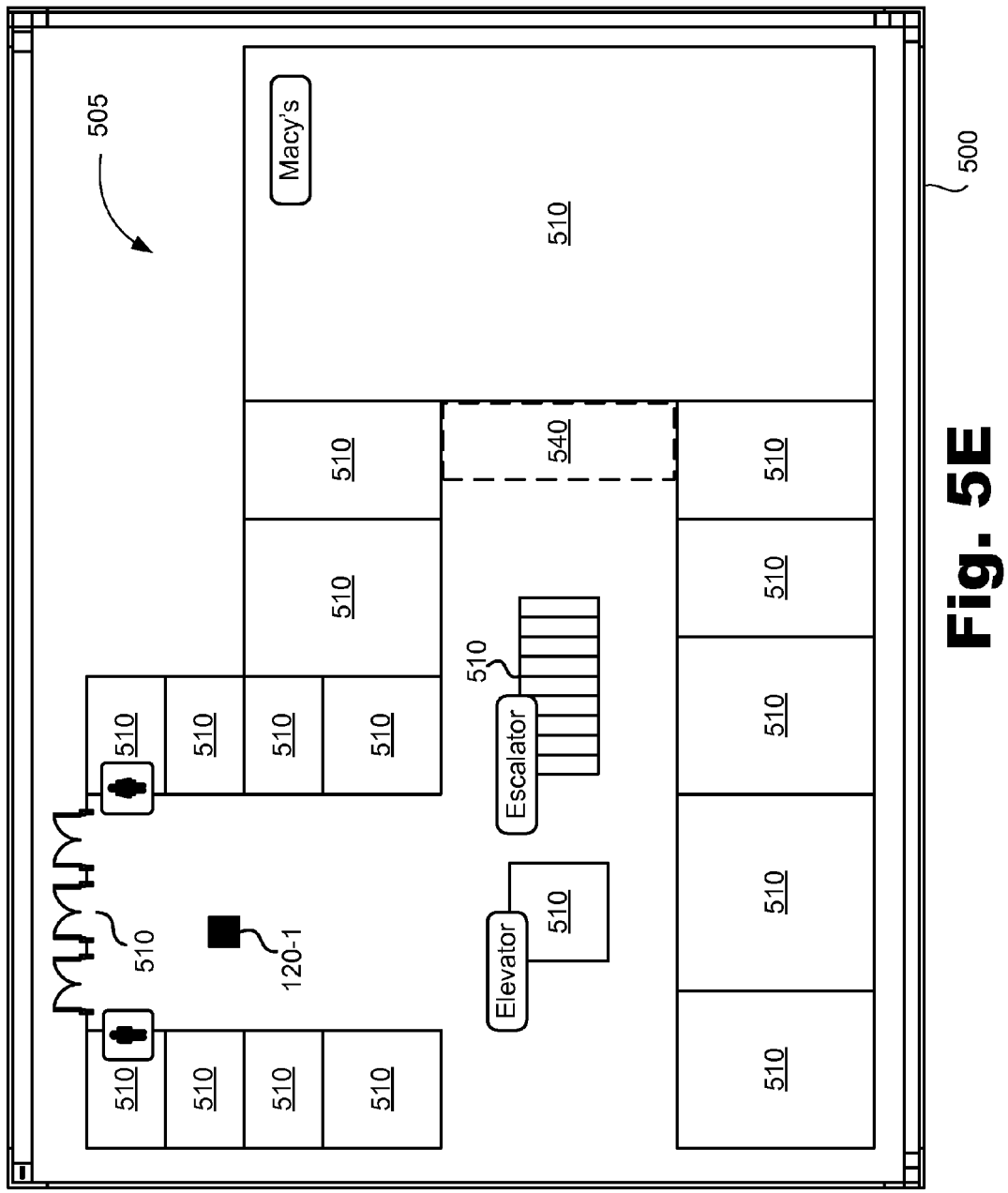

FIG. 5E illustrates premises area map 505 of premises area 430 with an exemplary premises trigger location 540 defined therein. Premises trigger location 540 may or may not be displayed in GUI 500. Premises trigger location 540 may be defined as being associated with a particular premises reference location 510. In the example illustrated in FIG. 5E, premises trigger location 540, which by definition includes a certain geographic area proximate to the "Macy's" premises reference location 510, is defined to be associated with the "Macy's" premises reference location 510.

Accordingly, premises trigger location 540 may be configured to trigger presentation of supplemental data associated with the "Macy's" premises reference location 510. For example, in response to mobile device 120-1 being located within premises trigger location 540, supplemental data associated with the "Macy's" premises reference location 510 may be presented in GUI 500 such as is shown in FIG. 5D, for example. Accordingly, when mobile device 120-1 is positioned proximate to the "Macy's" premises reference location 510 (e.g., within premises trigger location 540), the user 130-1 of mobile device 120-1 may be provided with access to supplemental data (or additional supplemental data) about the "Macy's" premises reference location 510 by way of mobile device 120-1. FIG. 5F illustrates an exemplary presentation of supplemental data in response to mobile device 120-1 being located within premises trigger location 540.

As another example, supplemental data may include route guidance. For example, user 130-1 of mobile device 120-1 may wish to travel from the location of the mobile device 120-1 to a premises reference location 510 within premises area 430. Mobile device 120-1 may provide one or more tools enabling the user 130-1 to provide input identifying a destination and requesting route guidance for traveling from the current location of the mobile device 120-1 to the destination. Supplemental data representative of route guidance may be generated and provided. FIG. 5G illustrates an exemplary presentation of supplemental data in the form of a visually depicted travel route 550 from the current location of mobile device 120-1 to the "Macy's" premises reference location 510. Premises reference locations 510 and any other features included in premises area 430 may be accounted for when travel route 550 is generated.

Mobile device 120-1 may present supplemental data in any suitable format (e.g., audio, visual, multimedia, etc.) and/or in accordance with any suitable protocol. For example, supplemental data may be visually displayed in GUI 500. As another example, supplemental data may be provided as audio output.

Premises area map 505 may be configured to facilitate user interaction. Accordingly, user 130-1 of mobile device 120-1 may utilize premises area map 505 to request supplemental data. As an example, I/O facility 240 may enable user 130-1 to select (e.g., highlight, scroll to, move a cursor over, etc.) a premises reference location 510 displayed in premises area map 505. In response to such a selection, supplemental data associated with the selected premises reference location 510 may be provided for presentation to the user 130-1.

In certain examples, premises map facility 270 of mobile device 120-1 may be configured to enable user 130-1 to custom define settings for supplemental data. For example, user 130-1 may be able to define and associate a custom premises trigger location 540 with a premises reference location 510. As another example, user 130-1 may define certain supplemental data and/or types of supplemental data to be presented. For instance, user 130-1 may define settings to indicate that sales information for a premises reference location should be included in supplemental data. In this or similar manner, user 130-1 may customize settings for the presentation of supplemental data associated with a premises area map 505.

In certain examples, premises area 430 may include a three-dimensional space such as a building or other premises having multiple levels. Premises map subsystem 110 may be configured to provide premises area maps representing different levels of premises area 430. In certain implementations, system 100 may be configured to detect elevation and/or changes in elevation associated with mobile devices 120. For example, location data sent from a mobile device 120-1 to premises map subsystem 110 may include data representative of an elevation of the mobile device 120-1. The elevation may be detected in any suitable way, including using GPS technologies. Premises map subsystem 110 may take elevation data into account when identifying a premises area map 505 associated with the reported location of the mobile device 120-1. Accordingly, appropriate maps may be identified and provided for certain elevations. As an example, when mobile device 120-1 moves from a first floor of premises area 430 to a second floor of premises area 430, premises map subsystem 110 may detect the change in elevation and/or the current location of mobile device 120-1 on the second floor and provide an premises are map 505 of the second floor to the mobile device 120-1. In certain examples, GUI 500 may be automatically updated with the new premises area map 505. In other examples, user approval may be requested before updating GUI 500.

In certain embodiments, mobile device elevation data may be obtained and/or confirmed from user input. For example, user 130-1 of mobile device 120-1 may input data representative of a floor or level of a premises area 430 at which user 130-1 is located. In certain embodiments, mobile device 120-1 may be configured to request elevation data from user 130-1. For instance, mobile device 120-1 may present a message asking user 130-1 to enter a floor number or to confirm that user 130-1 is located on a specific floor. Such a message may be presented in response to a predefined event, including, but not limited to, when mobile device 120-1 enters premises area 430 and/or when a confidence level for a detected elevation and/or corresponding floor number is below a predetermined threshold. A confidence level and predetermined confidence threshold may be defined as may suit a particular implementation. In certain embodiments, for example, a confidence level may be below a predetermined threshold when a margin of error for determining geographic location does not allow a floor of a premises area to be identified with certainty based on detected elevation of a mobile device 120-1.

In this or similar manner, user interaction may be used to determine and/or ensure accurate location detection. In certain embodiments, for example, user input may be utilized to ensure accurate relationships between detected mobile device locations and premises reference locations 510 in a premises area 430. For instance, user 130-1 of mobile device 120-1 may be asked to provide input confirming the location of mobile device 120-1 in relation to a premises reference location 510. As an example, when mobile device 120-1 is detected to be located within a premises reference location 510, a message may be presented by mobile device 120-1 asking the user 130-1 to confirm or deny that mobile device 120-1 is located in the premises reference location 510 (e.g., "Can you confirm that you are located in the Macy's store?"). As another example, when mobile device 120-1 is detected to be located within premises trigger location 540, a message may be presented by mobile device 120-1 asking the user 130-1 to confirm or deny that mobile device 120-1 is located proximate to a premises reference location 510 (e.g., "Can you confirm that you are located in front of the Macy's store?"). Such user input may be used to check and/or improve the accuracy of premises area maps in relation to detected physical locations of mobile devices 120 within premises areas.

Figure 5H:
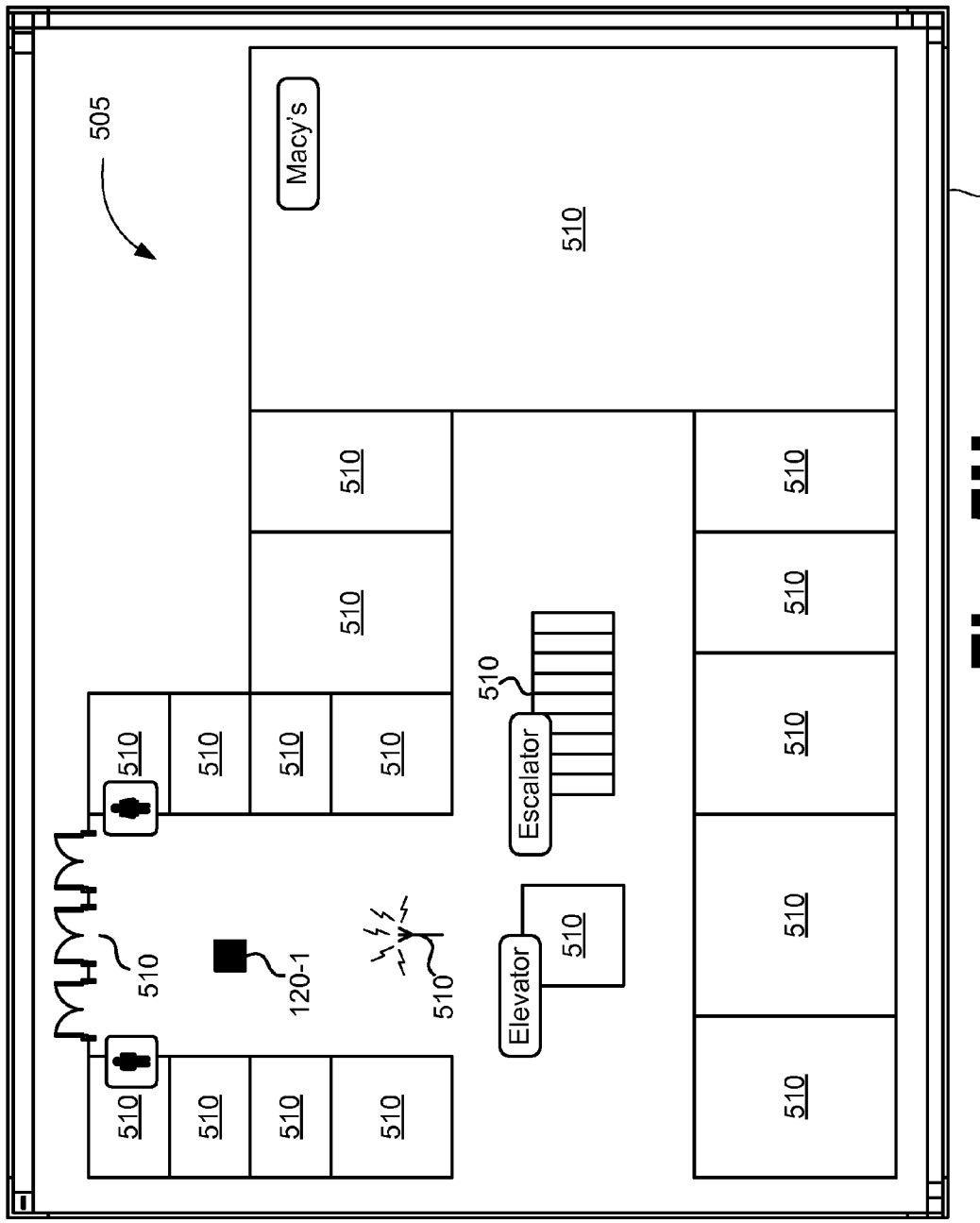

Other technologies may be employed for communicating with mobile devices 120 located within premises area 430. For example, premises reference locations 510 may include devices configured to communicate with mobile devices 120. Any suitable communications technologies may be used. As an example, a premises reference location 510 may include a device configured to communicate using Bluetooth or other local wireless communication technologies. FIG. 5H illustrates an exemplary premises reference location 510 including a communication device. When a mobile device 120-1 is located within range of the communication device, the mobile device 120-1 and the communication device may exchange communication signals.

Communications between the communication device and mobile device 120-1 may be used for various purposes, including checking and verifying the accuracy of premises area maps in relation to detected physical locations of mobile devices 120 within premises area 430. For example, when the communication device is configured to communicate using short-range wireless signals, a mobile device 120-1 receiving communication signals from the communication device is generally located within a certain distance of the communication device. When mobile device 120-1 is within range of the communication device, mobile device 120-1 may receive and process a communication signal transmitted by the communication device. Mobile device 120-1 may be configured to notify premises map subsystem 110 of this event. Premises map subsystem 110 may use the notification and location data of the mobile device 120 and/or the communication device to check accuracy of premises area map data in relation to the detected physical location of the mobile devices 120 within premises area 430.

Additionally or alternatively, other communications and/or data may be exchanged between the premises reference location 510 communication device and mobile device 120-1. For example, supplemental data, including any of the supplemental data described above, related to premises area map 505 and/or other premises reference locations 510 may be transmitted from the communication device to mobile device 120-1. As an example, a premises reference location 510 such as the Macy's store may include or provide a communication device configured to transmit supplemental data descriptive of operations, events, coupons, etc, related to the Macy's store. As another example, a communication device associated with a premises reference location 510 may transmit supplemental data such as wait time information associated with the premises reference location 510, such as a current wait time for a service provided at the premises reference location 510. For instance, e.g., a restaurant may provide data representative of a current wait time to be seated or otherwise served. Such supplemental data may be presented to a user of the mobile device 120-1 in any of the ways described above.

In certain embodiments, premises map subsystem 110 may be configured to receive data representative of one or more premises area maps from one or more premises area map providers. Premises area map providers may publish or otherwise provide the premises area maps to premises map subsystem 110 for distribution over network 125 as described above. Premises area map providers may include any person and/or entity having control of premises area maps. For example, an owner or operator of a premises may provide a premises area map of the premises area to premises map subsystem 110.

Figure 6:
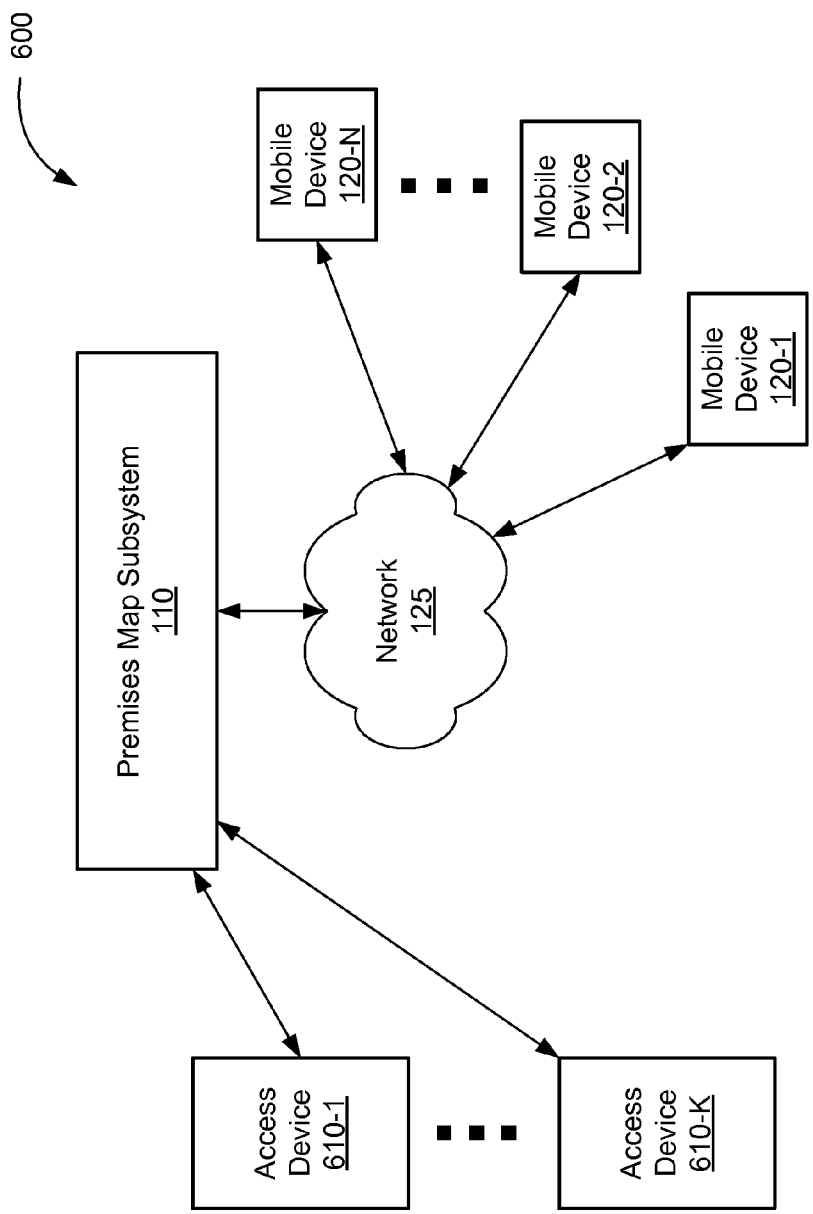
FIG. 6 illustrates another exemplary premises map system.

Data representative of premises area maps may be provided to premises map subsystem 110 in any suitable way. In certain embodiments, for example, premises area map providers may use one or more access devices to transmit data representative of premises area maps to premises map subsystem 110. FIG. 6 illustrates another exemplary premises map system 600. As shown in FIG. 6, access devices 610-1 through 610-K (collectively "access devices 610") may be communicatively connected to premises map subsystem 110. Access devices 610 may be configured to transmit data representative of premises area maps to premises map subsystem 110, which may store and distribute the premises area maps to one or more mobile devices 120 over network 125 as described above.

Access devices 610 and premises map subsystem 110 may communicate using any suitable communication technologies, including communicating over network 125, another network (e.g., the Internet), or directly. Access device 610 may include, but is not limited to, a computing device (e.g., a computer), a communication device, and any other device configured to provide data representative of premises area maps to premises map subsystem 110.

Additionally, premises area map updates may be provided to premises map subsystem 110 in any of the ways described above, including one or more access devices 610 transmitting data representative of premises area map updates to premises map subsystem 110. As an example, a map provider may provide a premises area map 505 of a building. Subsequently, a premises reference location 510 included in the premises area map 505 may change, and the map provider may provide a new premises area map 505 or an update to the premises area map 505 to premises map subsystem 110 to reflect the change.

Figure 7:
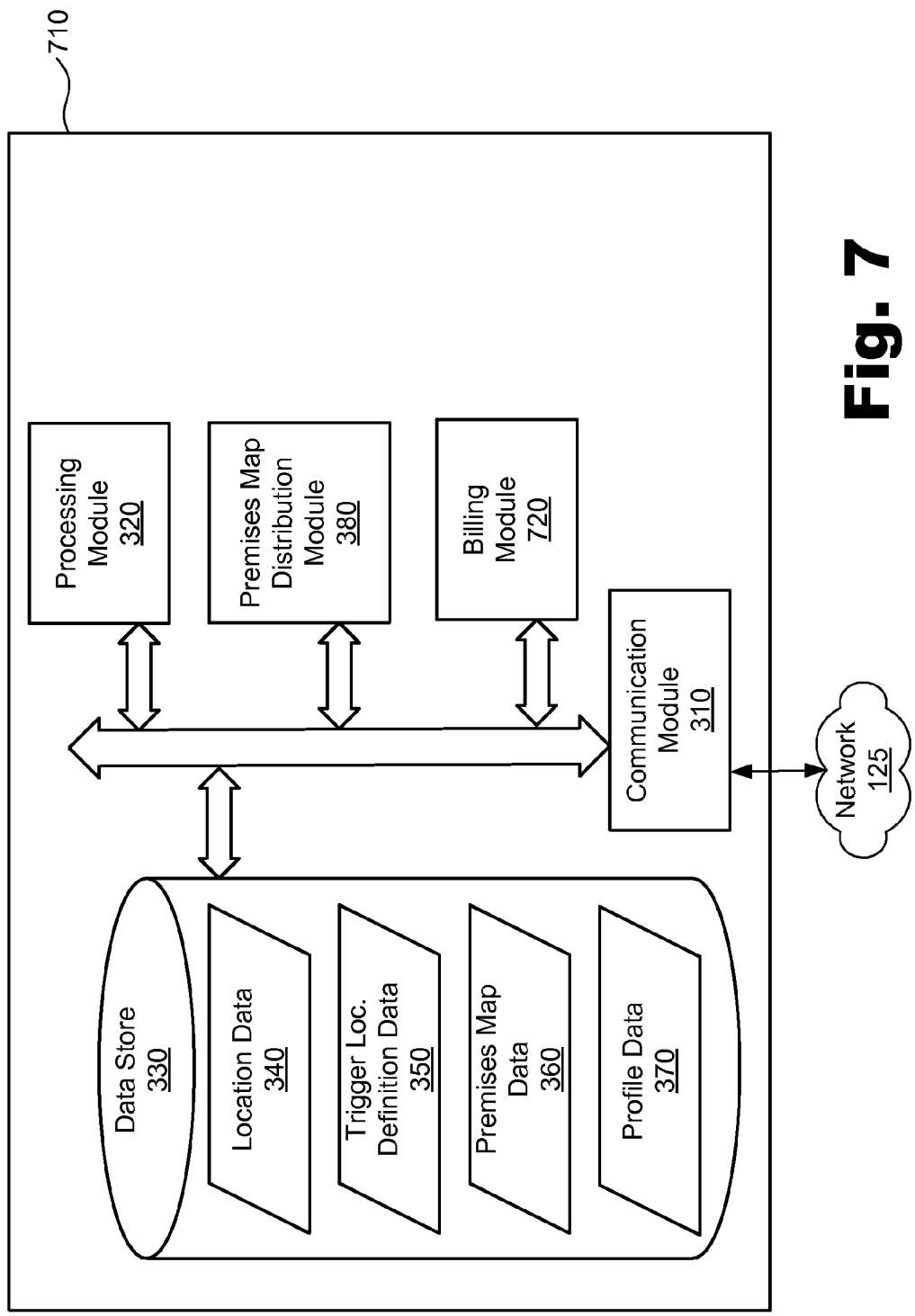
FIG. 7 illustrates another exemplary premises map subsystem.

System 100 and/or 600 may be configured to bill for premises map services and/or operations. In certain embodiments, for example, users 130 may be billed for subscriptions to and/or distributions of premises area maps to mobile devices 120. Additionally or alternatively, premises area map providers may be billed for storage and/or distribution of premises area maps to mobile devices 120. As an example, a premises area map provider may upload a premises area map 505 to premises map subsystem 110, which may store data representative of the premises area map 505. Premises map subsystem 110 may download data representative of the premises area map 505 to a mobile device 120-1 over network 125 as described above. The premises area map provider may be billed a certain fee for the download of the premises area map 505 to the mobile device 120-1. FIG. 7 illustrates another premises map subsystem 710 configured to bill for premises area map services and/or operations. Premises map subsystem 710 may be configured as premises map subsystem 110. In addition, premises map subsystem 710 may include a billing module 720 configured to bill for premises map services and/or operations. The billing module 720 may include hardware, computing instructions (e.g., software), or a combination thereof and may be configured to track and bill users 130 and/or premises area map providers in accordance with a predefined billing heuristic, which may be defined as may suit a particular implementation.

Figure 8:
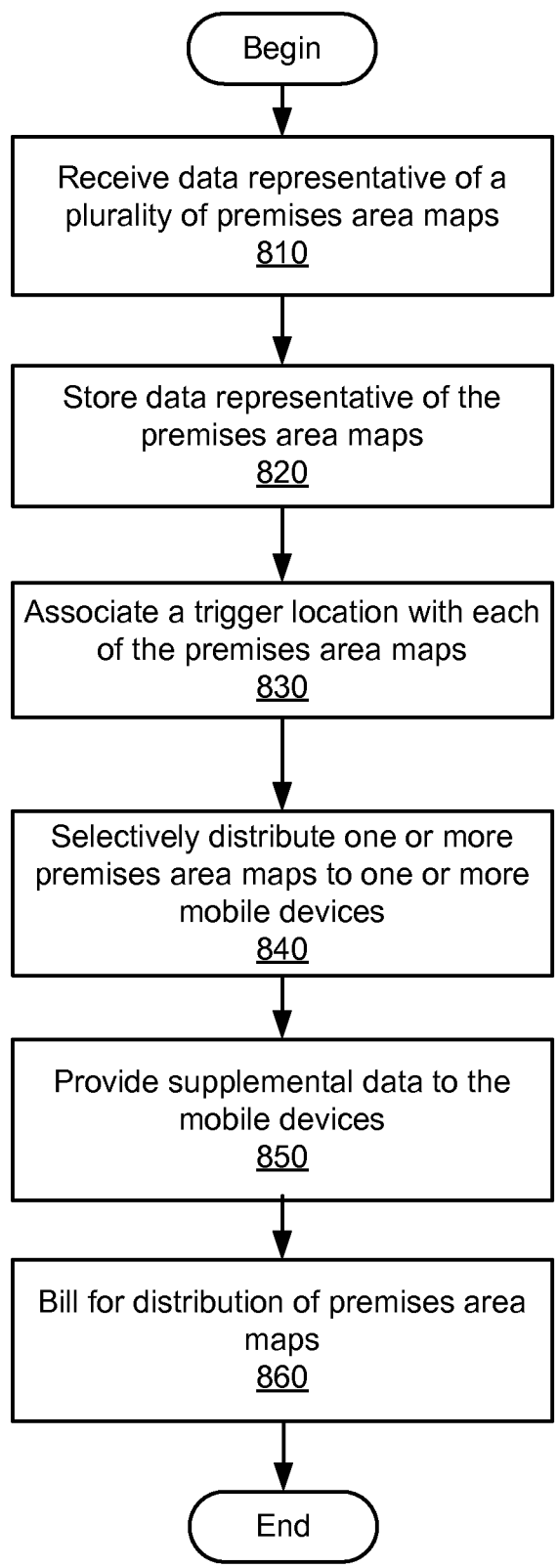
FIG. 8 illustrates an exemplary premises map collection and distribution method.

FIG. 8 illustrates an exemplary premises area map collection and distribution method. While FIG. 8 illustrates exemplary steps according to one embodiment, other embodiments may omit, add to, reorder, and/or modify any of the steps shown in FIG. 8.

In step 810, data representative of a plurality of premises area maps is received. Step 810 may be performed in any of the ways described above, including premises map subsystem 110 receiving the data from a plurality of premises area map providers using access devices to provide the data to premises map subsystem 110.

In step 820, data representative of the premises area maps is stored. Step 820 may be performed in any of the ways described above, including premises map subsystem 110 storing premises area map data 360 in data store 330.

In step 830, a trigger location is associated with each of the premises area maps. Step 830 may be performed automatically, manually, or using a combination of automatic and manual steps. In certain embodiments, the association may be based on input received from a premises area map provider. For example, a premises area map provider may provide data identifying a geographic location of a premises area (e.g., a street address or GPS coordinates). In certain embodiments, premises map distribution module 380 may be configured to define and associate a trigger location based on a predefined heuristic and on geographic location data associated with a premises area represented by a premises area map. The trigger location may be defined and/or associated with a premises area map in any of the ways described above.

In step 840, one or more premises area maps are selectively distributed to one or more mobile devices 120. Step 840 may be performed in any of the ways described above. For example, a geographic location of a mobile device 120-1 may be determined and a premises area map 505 associated with the geographic location may be identified as described above. Data representative of the identified premises area map 505 may be provided to the mobile device 120-1 over network 125. Hence, premises map subsystem 110 may detect when a mobile device 120-1 is physically located within a trigger location 420, identify a premises area map 505 associated with trigger location 420, and provide the mobile device 120-1 access to the identified premises area map 505.

In step 850, supplemental data is provided to one or more mobile devices 120. Step 850 may be performed in any of the ways described above, including premises map subsystem 110 providing supplemental data over network 125. Supplemental data may include any data or information described above.

In step 860, distribution of premises area maps is billed to one or more users and/or premises area map providers. Step 860 may be performed in any of the ways described above.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

determining, by a premises map subsystem comprising at least one computing device, that a mobile device is in a geographic location associated with a trigger location for a premises area;

identifying, by said premises map subsystem, a premises area map for said premises area, wherein said premises area comprises at least one building and said premises area map graphically represents an interior layout of said at least one building and at least one of a plurality of user selectable premises reference locations included in said at least one building, said at least one of said plurality of user selectable premises reference locations being selectable by said user within said premises area map;

transmitting, by said premises map subsystem in response to said determining that said mobile device is in said geographic location associated with said trigger location for said premises area, a notification message to said mobile device for presentation to a user, wherein said notification message is configured to indicate that said premises area map is available and to solicit input from said user, said input indicating approval or rejection of a transmission of said premises area map from said premises map subsystem;

detecting, by said premises map subsystem and in response to said notification message soliciting input from said user, a user input approving said transmission of said premises area map, said user input provided by said user by way of said mobile device;

providing, by said premises map subsystem in response to said user input, data representative of said premises area map to said mobile device over a network;

providing, by said premises map subsystem and in response to said input indicating approval of said transmission of said premises area map from said premises map subsystem, supplemental data related to said at least one of said premises reference locations on said premises area map;

determining, by said premises map subsystem, that said mobile device is in a second geographic location associated with a second trigger location for said premises area; and providing again, by said premises map subsystem and in response to said determining that said mobile device is in said second geographic location associated with said second trigger location for said premises area, said supplemental data related to said at least one of said premises reference locations on said premises area map.

2. The method of claim 1, wherein said determining includes:

detecting, by said mobile device, said geographic location of said mobile device; and receiving, by said premises map subsystem, location data from said mobile device over said network, said location data indicating said geographic location of said mobile device, and wherein said identifying includes using said location data to identify said premises area map.

3. The method of claim 1, wherein said identifying includes:

identifying said premises area map as being associated with at least one of said predefined trigger location and said premises area.

4. The method of claim 1, further comprising:

receiving, by said premises map subsystem, data representative of a plurality of premises area maps from a plurality of premises area map providers; and storing, by said premises map subsystem, said data representative of said plurality of premises area maps, wherein said identifying comprises using said geographic location to select said premises area map from said plurality of premises area maps.

5. The method of claim 4, further comprising billing, by said premises map subsystem, at least one of said premises area map providers for said providing said data representative of said premises area map to said mobile device over said network.

6. The method of claim 1, further comprising displaying, by said mobile device, said premises area map.

7. The method of claim 1, wherein said premises area map is configured to illustrate a position of said mobile device within said premises area.

8. The method of claim 7, wherein said premises area map is further configured to illustrate a position of another mobile device within said premises area.

9. The method of claim 1, wherein said supplemental data includes information about said at least one user selectable premises reference location selectable by said user within said premises area map.

10. The method of claim 9, wherein said at least one user selectable premises reference location selectable by said user within said premises area map comprises a restaurant and said supplemental data comprises wait time information associated with said restaurant.

11. The method of claim 1, further comprising:
providing, by said premises map subsystem and in response to said input indicating approval of said transmission of said premises area map from said premises map subsystem, a first level of supplemental data to said mobile device for presentation to a user; and
providing, by said premises map subsystem and in response to said determining that said mobile device is in a second geographic location associated with a second trigger location for a premises area, a second level of supplemental data to said mobile device for presentation to said user in response to said predefined event.

12. The method of claim 1, further comprising providing, by said premises map subsystem to said mobile device, route guidance from a position of said mobile device in said premises area map to a particular user selectable premises reference location included in said at least one user selectable premises reference location selectable by said user within said premises area map.

13. The method of claim 1, further comprising:
receiving, by said premises map subsystem, said input from said user via said mobile device over said network; and
using, by said premises map subsystem, said input from said user to check accuracy of said premises area map in relation to said geographic location of said mobile device.

14. The method of claim 1, tangibly embodied as computer-executable instructions on at least one non-transitory computer-readable medium.

15. The method of claim 1, wherein said at least one building comprises multiple levels and said premises area map is configured to graphically represent each of said multiple levels.

16. The method of claim 1, wherein said trigger location is defined according to profile data associated with a particular mobile device, said profile data including at least one permission for accessing said premises area map.

17. The method of claim 1, wherein said premises map subsystem includes a billing module configured to track and bill for premises map services in accordance with a predefined billing heuristic.

18. A method comprising:
receiving, by a premises map subsystem comprising at least one computing device, data representative of a plurality of premises area maps from a plurality of premises area map providers, wherein each of said plurality of premises area maps graphically represents an interior layout of at least one building associated with a corresponding premises area and at least one of a plurality of user selectable premises reference locations included in said at least one building, said at least one of said plurality of user selectable premises reference locations being selectable by a user within at least one premises area map among said plurality of premises area maps;
storing, by said premises map subsystem, said data representative of said plurality of premises area maps;
associating, by said premises map subsystem, at least one trigger location with said at least one premises area map;
determining, by said premises map subsystem, that one or more mobile devices are in one or more geographic locations associated with said at least one trigger location associated with said at least one premises area map;
transmitting, by said premises map subsystem, a notification message configured to indicate that said at least one premises area map is available and to solicit input indicating approval or rejection of a transmission of said at least one premises area map from said premises area map subsystem; and
selectively distributing, by said premises map subsystem, said at least one premises area map to said one or more mobile devices in response to said determining that said one or more mobile devices are in said one or more geographic locations associated with said at least one trigger location associated with said at least one of said plurality of premises area maps and in response to a receipt of user input indicating approval of said transmission of said at least one premises area map;
providing, by said premises map subsystem and in response to said input indicating approval of said transmission of said premises area map from said premises map subsystem, supplemental data related to said at least one of said premises reference locations on said premises area map;
determining, by said premises map subsystem, that said one or more mobile devices are in a second of said one or more geographic locations associated with a second trigger location for said premises area; and
providing again, by said premises map subsystem and in response to said determining that said mobile device is in said second geographic location associated with said second trigger location for said premises area, said supplemental data related to said at least one of said premises reference locations on said premises area map.

19. A system comprising:
a communication module configured to receive location data from a mobile device over a network, said location data indicating a geographic location of said mobile device;
at least one processor; and
a premises map distribution module configured to direct said at least one processor to
determine, based on said location data, that said mobile device is in said geographic location associated with a trigger location;
identify a premises area map associated with said geographic location of said mobile device,
transmit a notification message configured to indicate that said premises area map is available and to solicit input indicating approval or rejection of a transmission of said premises area map from said premises area map subsystem; and provide data representative of said premises area map to said mobile device in response to said determining that said mobile device is in said geographic location associated with said trigger location and in response to a receipt of user input indicating approval of said transmission of said premises area map;

wherein said communication module is configured to receive data representative of a plurality of premises area maps from a plurality of premises area map providers, and wherein said premises map distribution module is configured to direct said at least one processor to use said geographic location to select said premises area map from said plurality of premises area maps, said premises area map graphically representing an interior layout of at least one building within a premises area shown in said premises area map and at least one of a plurality of user selectable premises reference locations included in said at least one building, said at least one of said plurality of user selectable premises reference locations location being selectable by a user within said premises area map; and wherein said premises map distribution module is configured to direct said at least one processor to provide, in response to said input indicating approval of said transmission of said premises area map, supplemental data related to said at least one of said premises reference locations on said premises area map, determine that the mobile device is in a second geographic location associated with a second trigger location for said premises area, and provide again, in response to said determining that said mobile device is in said second geographic location associated with said second trigger location for said premises area, said supplemental data related to said at least one of said premises reference locations on said premises area map.

20. The system of claim 19, further comprising a billing module configured to bill at least one of a user associated with said mobile device and one of said premises area map providers for said providing said data representative of said premises area map to said mobile device.

* * * * *